United States Patent [19]

Tinholt

[11] 4,103,765
[45] Aug. 1, 1978

[54] RESILIENT SUPPORT FOR COIL OF VISCOUS FLUID DRIVE

[75] Inventor: Thomas H. Tinholt, Marshall, Mich.

[73] Assignee: Eaton Corporation, Cleveland, Ohio

[21] Appl. No.: 784,897

[22] Filed: Apr. 5, 1977

[51] Int. Cl.² .................... F16D 43/25; C09J 5/00
[52] U.S. Cl. .................... 192/58 B; 29/156.8 FC; 29/436; 29/460; 156/305; 192/82 T; 267/156; 403/209; 403/267
[58] Field of Search ............ 192/58 B, 82 T; 29/156.8 FC, 436, 460; 156/305; 403/266, 267, 209; 337/372; 73/363.9; 267/156; 236/101 D

[56] References Cited

U.S. PATENT DOCUMENTS

| | | | |
|---|---|---|---|
| 2,543,551 | 2/1951 | Krug | 403/209 X |
| 3,363,734 | 1/1968 | Sabat | 192/58 B |
| 3,713,947 | 1/1973 | Hawkins | 156/305 X |
| 4,054,193 | 10/1977 | Streeter | 192/82 T X |

Primary Examiner—Allan D. Herrmann
Attorney, Agent, or Firm—R. J. McCloskey

[57] ABSTRACT

Solid resilient compound retaining the outer end of a bimetallic helical coil spring of a temperature responsive viscous fluid drive to a clip. The clip is secured to the cover plate of the drive. The inner end of the spring is secured to the valve shaft while the outer end of the spring is configured into a bight having a straight center portion inserted within a slot in the clip. A liquid compound is placed in the bight and surrounds a portion of the clip and fills the bight. The liquid solidifies to resiliently retain the outer end relative to the clip. A method for assembling the spring, valve shaft, cover plate, and clip is also described.

14 Claims, 7 Drawing Figures

RESILIENT SUPPORT FOR COIL OF VISCOUS FLUID DRIVE

With known designs of temperature responsive viscous fluid drives manufactured by the assignee of this invention, there has been encountered, on four cylinder vehicle engines, problems with retaining the bimetallic coil spring. These problems appear to be more pronounced on four cylinder vehicle engines due to their higher rpm's and vibrational characteristics. The standard retention means used for the outer end of the bimetallic coil spring, as illustrated in U.S. Pat. No. 3,227,254, resulted in unacceptable wear of the clip resulting in a larger slot and freedom of movement of the spring and, accordingly, the valve. Attempts were made to weld the outer end to the clip to reduce relative movement therebetween but this resulted in spring breakage and increased hysteresis in valve movement. A number of other rigid clamping methods were tried on the outer end, all of which resulted in unacceptable wear of the outer end of the clip. Applicant is also aware of the outer end support arrangement illustrated in U.S. Pat. No. 3,263,783 wherein the straight outer end of the spring fits between two widely spaced cast members. In order to prevent excess circumferential movement of the outer end of this arrangement Silastic ® 732 RTV adhesive/sealant manufactured by Dow Corning was placed between the outer end and the cast end members. The use of Silastic ® compound, however, was solely for circumferential support and location of the outer end and had little if any effect on radial movement of the outer end caused by vibration.

It is, accordingly, an object of the invention to make use, to the greatest extent possible, present tooling to provide a support system for the outer end of a bimetallic coil spring which will result in minimal valve hysteresis and maximum spring support.

The preceding object has been accomplished by providing a bight in the outer end of the spring which has its center portion in the slot of the clip and by filling the bight and the adjoining portion of the clip with a fluid compound which hardens to a resilient solid material.

Figure 4:
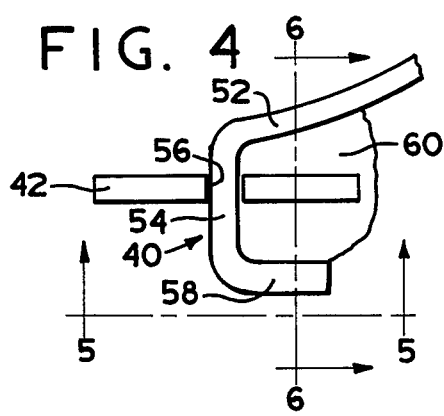
FIG. 4 is an enlarged view of a portion of the spring-clip arrangement illustrated in FIG. 3.
Figure 5:
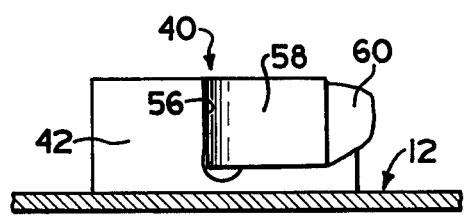
Figure 6:
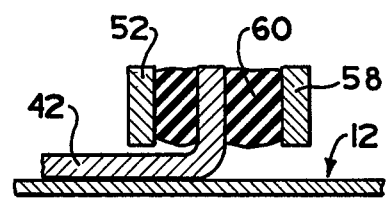

FIGS. 5 and 6 are respectively views taken along lines 5—5 and 6—6 of FIG. 4.

Figure 7:
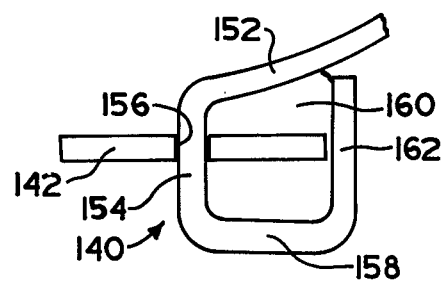

FIG. 7 is a view similar to FIG. 4 illustrating another embodiment of the invention.

Figure 2:
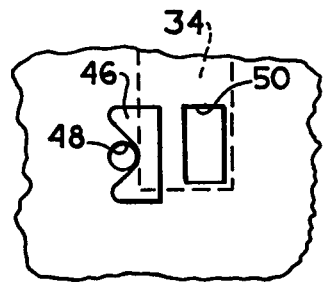
FIG. 2 is a view taken along line 2—2 of FIG. 1.
Figure 1:
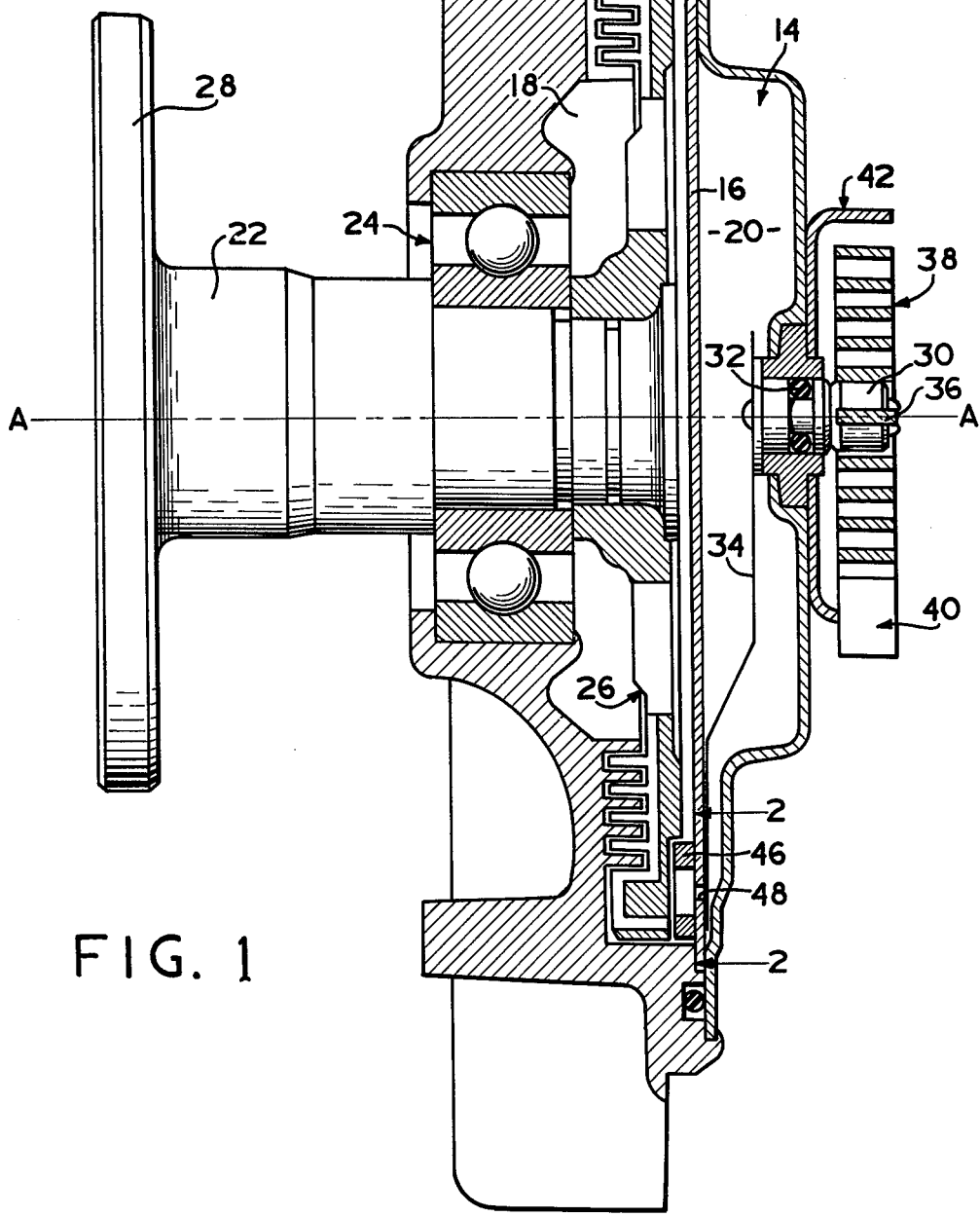
FIG. 1 is a side elevational view of a temperature responsive viscous fan drive according to features of the invention.
Figure 3:
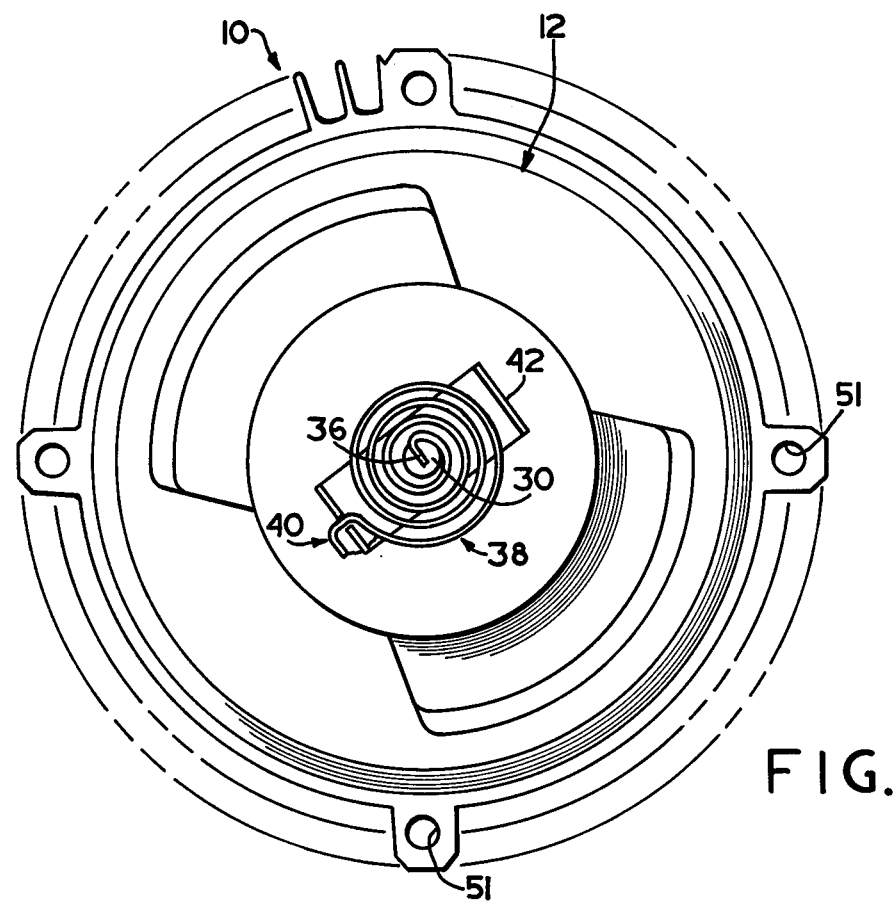
FIG. 3 is a front view of the drive of FIG. 1.

Referring to FIGS. 1 to 3, viscous fan drive 10 comprises a housing member 12 defining a cavity 14 that is divided by a radially extending valve plate 16 into a working chamber 18 and a reservoir 20. An input shaft 22 is supported for rotation on housing member 12 by a ball bearing 24. An annular generally radially extending clutch member 26 is secured to one end of input shaft 22 and located within working chamber 18. The other end of input shaft 22 includes a flange 28 which may be secured to a shaft or pulley that is rotated by an engine in a vehicle (not illustrated). Viscous fluid (not illustrated) is provided within cavity 14 to transfer rotational forces from clutch member 26 to housing member 12. Such force transfer is well known in the art and is accomplished by viscous shear between mating surfaces of the clutch and housing members. Mounted along the rotational axis A—A of drive 10 is a valve shaft 30 which is free to rotate in housing member 12. An appropriate seal 32 is provided between shaft 30 and housing member 12 to prevent fluid leakage from reservoir 20. One end of valve shaft 30 is secured to a valve arm 34 while the other end of valve shaft 30 is secured to the inner end 36 of a bimetallic helical coil spring 38. The outer end 40 of spring 38 is connected to a clip 42 which is rigidly attached to the cover plate portion of housing member 12.

An annular pumping surface 44 is located on clutch member 26. A pump element 46 is rigidly secured to valve plate 16 and is closely spaced from pumping surface 44. A discharge passage 48 is located in valve plate 16 and communicates working chamber 18 with reservoir 20. As illustrated in FIG. 2, when clutch member 26 rotates counterclockwise, fluid flows from working chamber 18 to reservoir 20 via passage 48. Located immediately behind pump element 46 is an inlet passage 50 which communicates reservoir 20 with working chamber 18. As best seen in FIG. 2, valve arm 34 is movable to either cover inlet passage 50 or discharge passage 48.

Briefly, drive 10 operates in the following manner. A fan (not illustrated) is secured to housing member 12 by bolts located in openings 51. Flange 28 is secured to the shaft of a vehicle engine and is rotated by the engine to rotate input shaft 22 and, accordingly, clutch member 26. When valve arm 34 is located in the position illustrated in FIG. 2, fluid is pumped out of working chamber 18 into reservoir 20. When the fluid is pumped out of the working chamber, a minimal amount of drive occurs between clutch member 26 and housing member 12. As the temperature of the vehicle is increased and such temperature increase is sensed by helical coil spring 38, valve arm 34 is rotated to the left in FIG. 2 covering discharge passage 48 and uncovering inlet passage 50. This rotation prevents the flow of fluid out of working chamber 18 to reservoir 20 while allowing for the flow of fluid from reservoir 20 into working chamber 18 through inlet passage 50. As fluid fills working chamber 18, rotation of clutch member 26 results in rotation of housing member 12 through viscous shear. As the engine cools down and such lower temperatures are sensed by spring 38, valve arm 34 is moved back to the position illustrated in FIG. 2 and fluid again is pumped out of working chamber 18 into reservoir 20 resulting in a decrease in the rotational speed of housing member 12.

Referring now to FIGS. 4 through 6, outer end 40 of coil spring 38 is configured as a bight having an inner portion 52 adjacent the body of spring 38 and generally parallel to clip 42, and extended straight center portion 54 passing through a slot 56 in clip 42, and an outer portion 58 spaced from and generally parallel to clip 42. Slot 56 in clip 42 is just large enough to provide for insertion of center portion 54 of spring 38. Provided within the bight of outer end 40 there is located a solidified resilient compound 60 such as Silastic ® 732 RTV adhesive/sealant manufactured by Dow Corning and containing one part silicone rubber which tends to resist radial movement of outer end 40 relative to clip 42 and resiliently retains outer end 40 in a neutral position. In assembly, clip 42 is first welded to the cover plate of housing member 12. Valve shaft 30 is then located within the cover plate and inner end 36 of coil spring 38 is fixed in shaft 30 and center portion 54 of outer end 40 is located within slot 56 of clip 42. Center portion 54 must have a long enough straight portion to ensure both clearance between inner and outer portions 52 and 58 and clip 42 because of coil and clip tolerances and allow space for absorption of coil vibrations. Resilient material 60 is then located within the bight in a liquid form and allowed to solidify in place. In this way, it is assured that the proper location of helical coil spring 38 relative to clip 42 and valve shaft 30 is achieved without any unnecessary radial loading on the valve shaft. Upon solidification of the resilient material, outer end 40 is prevented from moving by resilient material 60. Valve plate 16 is then fixed relative to valve arm 34 and welded to the cover plate.

FIG. 7 illustrates an alternate embodiment of the invention wherein similar parts are numbered similar to those in FIGS. 1 to 6 but preceded by 100. Outer portion 140, after the bight, is bent radially back by portion 162 toward the helical coil spring to form a loop. This alternate arrangement provides for better enclosure of the liquid compound used during assembly and further aids in the retention of the resilient solidified compound 160 during operation since the compound is substantially enclosed.

Acceptable results have been accomplished with both of the illustrated embodiments. It is, however, extremely important to not unduly restrict radial movement of outer end 40. With the use of Silastic ® adhesive/sealant and 40 to 50 thousands of an inch clearance between the coils of spring 38, about 80 to 100 thousandths of an inch should be provided between portions 52 and 58 and clip 42. Further, compound 60 or 160 must be able to withstand the heat of drive 10.

The Silastic ® compound can be used for extended periods at temperatures up to 450° F (232° C). The compound further has an ASTM D 676 Durometer Hardness, Shore A Scale of 25 after approximately 72 hours of solidification with a tensile strength of 275 psi and an elongation percent of 450 measured under ASTM D 412. The volume coefficient of thermal expansion for the compound from 32° to 212° F (0° – 100° C) is $9.3 \times 10^{-4}$. Of course, it is anticipated that other compounds may be used. The most critical characteristics of any compound are that they: withstand the temperatures that exist in the drive environment ($-40°$ F to $400°$ F); provide the proper degree of resilients; withstand the physical environment (oil, grease, dirt, etc.); and adhere to the spring and clip.

I claim:
1. A temperature responsive viscous fluid drive comprising:
   a housing member rotatable about an axis and defining a cavity;
   a valve plate dividing said cavity into a working chamber and a reservoir;
   a clutch member located within said working chamber and rotatable about said axis;
   an input shaft secured to one of said members to rotate said one member about said axis and being supported on the other member for relative rotation;
   viscous shear fluid in said cavity;
   valve means to control fluid communication between said reservoir and said working chamber;
   means defining an opening on one of said members;
   temperature responsive means controlling said valve means and including a bimetallic member having one end secured to said valve means and another end located in said opening;
   retention means located on the other end of said bimetallic member; and
   resilient means associated with said retention means to retain said other end in a given position relative to said opening and resiliently restrict radial movement of said other end from said given position.
2. A drive according to claim 1 wherein:
   said valve means includes a valve shaft disposed on said axis and projecting through said housing member;
   said one end of said bimetallic member is secured to said valve shaft;
   said retention means is a bight having a center portion located within said opening; and
   said resilient means is a solid compound filling said bight and enclosing a portion of said defining means.
3. A drive according to claim 2 wherein said other end is configured into a loop.
4. A drive according to claim 2 wherein:
   said bimetallic member is a helical coil spring having a series of coils spaced approximately X units apart;
   said defining means is a clip; and
   said bight has an inner portion spaced approximately 2X units from said clip and generally parallel thereto and an outer portion spaced approximately 2X units from said clip and generally parallel thereto.
5. A drive according to claim 4 wherein:
   said outer portion of said spring further includes another portion secured to said outer portion of said bight and projecting toward said spring to form a loop substantially enclosing a portion of said clip; and
   said compound substantially fills said loop.
6. A drive according to claim 4 wherein X units is substantially equal to 0.040 to 0.050 inches.
7. A drive according to claim 1 wherein:
   said input shaft is secured to said clutch member;
   said defining means is secured to said housing member;
   said valve means includes a valve shaft disposed on said axis and projecting through said housing member and said clip; and
   said one end of said spring is secured to said valve shaft.
8. A drive according to claim 7 wherein:
   said retention means is a bight having a center portion in said opening; and
   said resilient means is a solid resilient compound filling said bight and enclosing a portion of said clip.
9. A drive according to claim 1 wherein:
   said input shaft is secured to said clutch member;
   said valve means includes an opening in said valve plate radially disposed relative to said axis, a valve shaft disposed on said axis and projecting through said housing and said clip and having an inner end in said reservoir and an outer end exteriorly of said cavity, and a valve arm secured to said inner end of said valve shaft and having a portion adapted to cover said opening in said valve plate;
   said one end of said bimetallic member is secured to the outer end of said valve shaft;
   said retention means is configured as a relatively straight center portion located within said opening and an inner and outer portion angled relative to said straight portion and spaced from one another;

said resilient means is a solid resilient compound interposed between said inner and outer portions; and said defining means aid in retention of said solid compound relative to said opening.

10. A drive according to claim 9 wherein said defining means is a clip secured to said housing member.

11. A drive according to claim 1 wherein:

said defining means is a clip;

said retention means has an inner portion generally parallel to and spaced from said clip and an outer portion generally parallel to and spaced from said clip; and said resilient means is a solid resilient compound interposed between said inner portion and said clip and said outer portion from said clip.

12. A drive according to claim 11 wherein said retention means has a generally straight portion interconnecting said inner and outer portions, located within said opening and having a length exceeding the width of said opening.

13. A drive according to claim 1 wherein:

said input shaft is secured to said clutch member;

said valve means includes an opening in said valve plate radially disposed relative to said axis, a valve shaft disposed on said axis and projecting through said housing and having an inner end in said reservoir and an outer end exteriorly of said cavity, and a valve arm secured to said inner end of said valve shaft and having a portion adapted to cover said opening in said valve plate;

said one end of said bimetallic member is secured to the outer end of said valve shaft; and said opening is defined on said housing member.

14. In assembling a temperature responsive viscous fan drive having a bimetallic helical coil spring, including an inner end and an outer end configured into a bight having a center portion, a housing member that is mounted on an input shaft for rotation about the input shaft axis, a clip secured to the cover plate of the housing member substantially symmetrically about said axis and having a slot therein; and a valve shaft disposed on said axis and projecting through said cover plate and said clip and having a slot therein, the steps of:

A. securing said clip to said cover;

B. placing the valve shaft in said cover plate and then irrespective of sequence C. placing the inner end of said spring in said slot of said valve shaft; and D. placing the center portion of said bight in said slot of said clip; and then irrespective of sequence E. securing said valve shaft to said inner end; and F. placing a liquid compound that will solidify into a solid resilient material in said bight and around said clip; and then G. allowing said liquid compound to solidify.

* * * * *

UNITED STATES PATENT AND TRADEMARK OFFICE
CERTIFICATE OF CORRECTION

PATENT NO. : 4,103,765
DATED : August 1, 1978
INVENTOR(S) : Thomas H. Tinholt

It is certified that error appears in the above-identified patent and that said Letters Patent are hereby corrected as shown below:

Col. 4, line 44:    After "is" insert "a clip".

Signed and Sealed this

Twenty-third Day of January 1979

[SEAL]

Attest:

RUTH C. MASON
*Attesting Officer*

DONALD W. BANNER
*Commissioner of Patents and Trademarks*